Patented Aug. 9, 1949

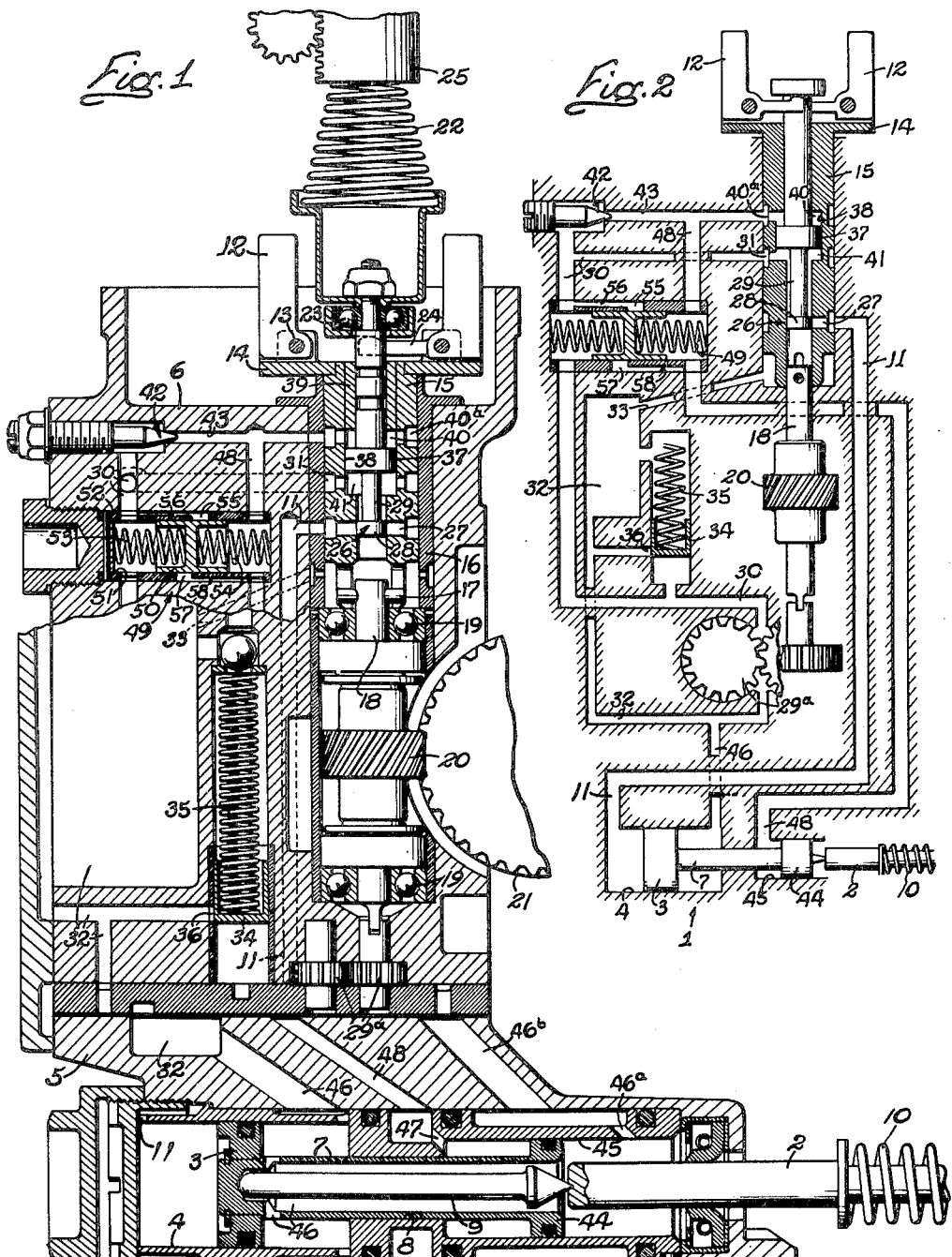

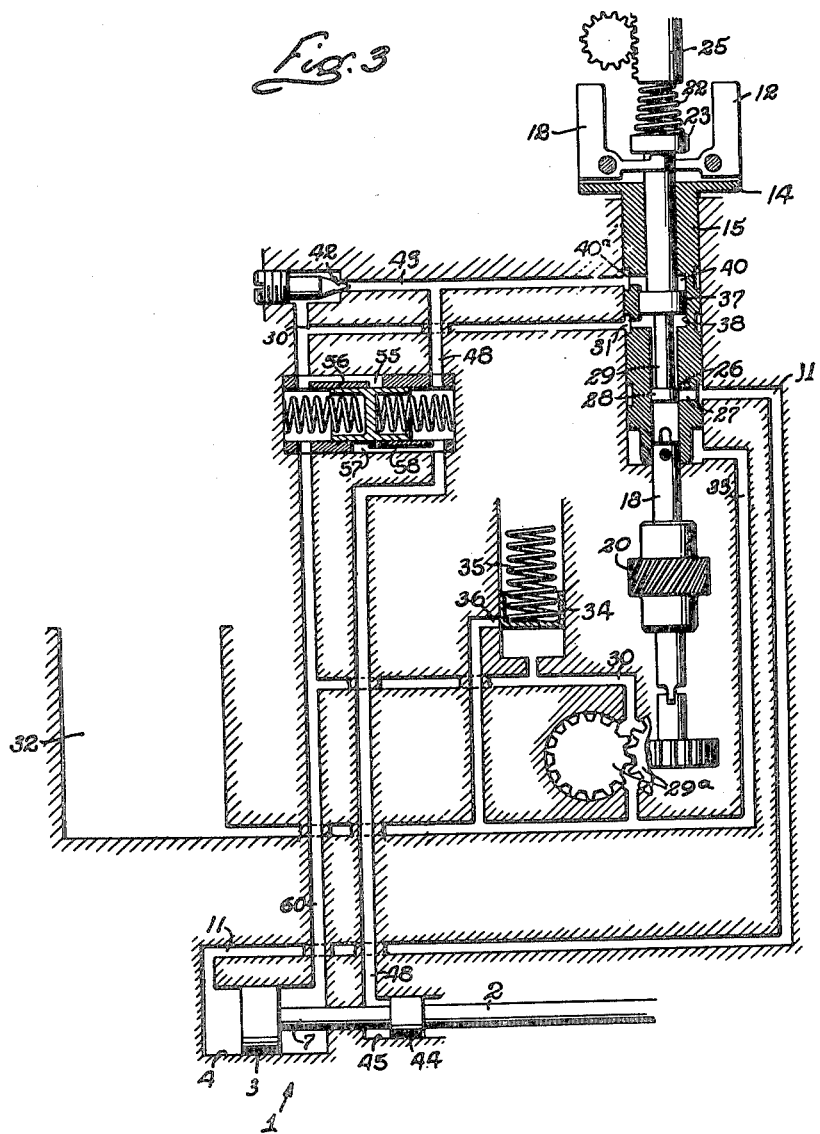

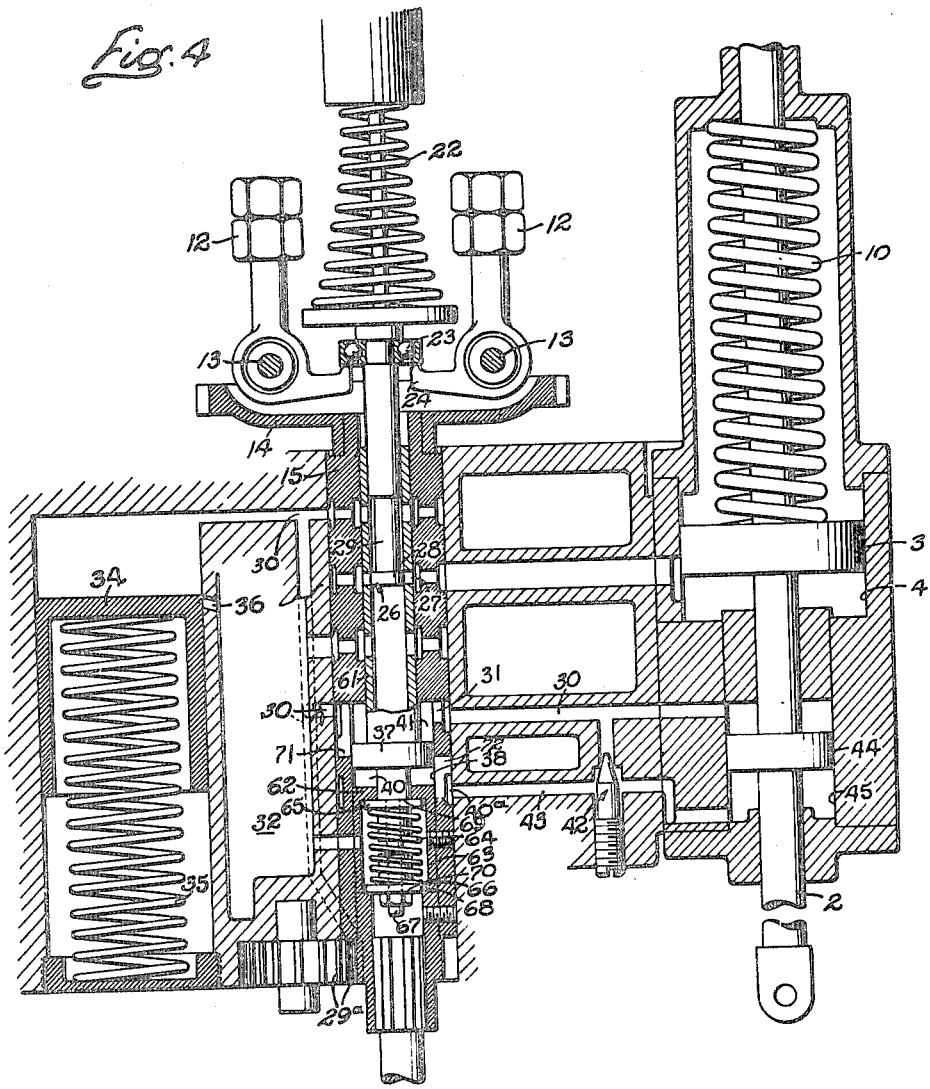

2,478,183

UNITED STATES PATENT OFFICE 2,478,183

CONDITION CONTROL APPARATUS

George Forrest Drake, Rockford, Ill., assignor to Woodward Governor Company, Rockford, Ill., a corporation of Illinois Application March 15, 1945, Serial No. 582,971

14 Claims. (Cl. 121—42)

1

This invention relates to apparatus for controlling the operation of a servo or power actuator in accordance with variations in a control force produced by deviations of a condition to be controlled from a desired or constant value. More particularly, the invention has reference to such control apparatus in which the compensating or restoring force is derived hydraulically as an incident to a change of the servo energizing force by the action of its condition sensing device.

A general object of the present invention is to provide a fluid actuated compensating mechanism of the above character which is unaffected by external pressure changes, which is extremely sensitive, which is simple and inexpensive to construct with the required accuracy, and which has a wider operating range than the mechanisms heretofore employed.

The invention also resides in the novel manner of deriving the compensating force from two super-atmospheric pressures and applying the resultant force in opposition to the main control force.

Other objects and advantages of the invention will become apparent from the following detailed description taken in connection with the accompanying drawings, in which Figure 1 is a fragmentary sectional view of control apparatus embodying the present invention.

Fig. 2 is a schematic view and hydraulic circuit diagram of the apparatus shown in Fig. 1.

Figs. 3 and 4 are schematic views and hydraulic circuit diagrams of modifications.

For purposes of illustration, the improved compensating mechanism is shown in the drawings incorporated in apparatus of the hydraulic type in which a control force, variable in direction and magnitude with changes in the controlled condition such as the speed of a prime mover, governs the operation of a servo motor 1 for positioning a rod 2 connected to a regulator such as a throttle, control valve or propeller pitch controller or the like by which changes in the prime mover speed may be made. In the form shown in Figs. 1 and 2, the servo motor is of the single acting hydraulic type comprising a piston 3 reciprocable in a stationary cylinder 4 supported within a housing 5 attached to the lower end of the casing 6 of the governor proper. Herein, the piston is on the end of a tubular rod 7 slidable in a guide 8 and connected by a rod 9 to the regulator rod 2. The latter projects from the housing 5 and is urged in one direction by a compression spring 10. Fluid under pressure is introduced into or withdrawn from the head end of the cylinder 4 through a passage 11 to control the energization of the servo and therefore the position of the regulator rod 2.

Various types of means may be employed to detect deviations of the controlled condition or speed from the value desired to be maintained. The detecting means herein shown comprises upstanding weights 12 pivoted at 13 on a head 14 which is fast on the upper end of a ported sleeve 15 rotatable in a bushing 16 which is supported in a bore of the casing 6. The lower end of the sleeve is coupled by a pin 17 to a shaft 18 journaled in bearings 19 and carrying a gear 20 which meshes with a gear 21 driven by the prime mover controlled by the governor. By driving the flyballs through the sleeve 15, the latter is used in a manner well known in the art to eliminate static friction between the valve elements.

The centrifugal force acting on the flyballs is balanced against a compression spring 22 bearing downwardly against the inner race of a ball thrust bearing 23 whose outer race is engaged by arms 24 of the flyballs. The speed-setting of the governor may be adjusted by manually shifting a member 25 to vary the speeder spring stress.

The control force derived from changes in the flyball speed is applied mechanically to a movable part of a device having parts which are relatively movable in opposite directions away from a predetermined neutral position in response to opposite deviations of the control force away from a predetermined value. Herein, this control device takes the form of a pilot valve 26 formed by ports 27 in the sleeve 15 coacting with a land 28 on the lower end of a stem 29 which is slidable in the rotating sleeve and is connected at its upper end to the inner race of the bearing 23.

Fluid at a substantially constant super-atmospheric pressure, for example 150 pounds per square inch, is supplied by a pump including gears $29^a$, one of which is connected to the lower end of the shaft 18. Through a passage 30, an annular passage 31, and ports in the sleeve 15, oil supplied under pressure by the pump is delivered into the sleeve above the land 28. The pump inlet communicates with sump spaces and channels 32, one of which is connected through holes 33 with the interior of the sleeve 15 below the land 28. The pressure delivered by the pump is maintained approximately constant by a relief valve whose piston 34 is loaded by a spring 35 so that when the supply pressure exceeds a predetermined value, fluid will be by-passed to the sump through a port 36.

It will be apparent that when the land 28 is lowered below the ports 27 in response to a speed decrease below the prevailing governor setting, oil will flow through the passage 11 into the servo cylinder moving the piston 3 to the right to increase the delivery of power by the prime mover. Conversely, raising of the land above the ports 27 in response to a speed increase allows fluid in the servo cylinder to escape to the sump, thereby allowing the servo piston to be moved by the spring 10 to decrease the energy supply to the prime mover.

Stabilized operation of apparatus of the character described may be obtained by applying a modifying force for restoring the valve elements toward their neutral positions immediately following a condition change whereby to produce a drooping characteristic. In general, this modifying force is created hydraulically by maintaining super-atmospheric pressures in two fluid filled chambers and varying the relative values of these pressures in response to the creating of a servo energizing force by the action of the valve 26, whereby to produce a difference in pressure which acts initially in a direction to restore the valve parts to neutral position but is dissipated gradually so that the two pressures become equalized as the controlling condition, by the correcting action of the servo actuated regulator, becomes restored to the desired value under the changed load.

In the form shown in Figs. 1 to 3, the modifying force is applied to a part, in this instance a wall of piston 37, which is connected to the valve element or stem 29 that receives the control or flyball force. Herein, the piston 37 is located intermediate the ends of the latter and is slidable in a cylinder 38 formed within the rotating sleeve 15 and closed at its upper end by a bushing 39 so as to define a chamber 40 above the piston 37 and a chamber 41 between the piston and the main valve land 28. To provide effective pressure areas on opposite sides of the piston 37, the latter is made larger than the valve land 28. In this instance, the oppositely facing areas are of equal size, this being accomplished by making the upper end portion of the stem 29 of the same diameter as the land 28.

In accordance with a more detailed aspect of the invention, the modifying force is derived by maintaining fluid in the chamber 41 at a substantially constant super-atmospheric pressure and fluid in the chamber 40 at a pressure which under equilibrium condition is equal to the constant pressure but which, in response to opposite movements of the servo actuator 1, is raised above or decreased below the constant pressure. By locating the piston 37 on the high pressure side of the pilot valve land 28, the constant supply pressure is maintained in the chamber 41 without added complication of the valve structure and, at the same time, the governor pump is utilized to perform the additional function of supplying this pressure, the connection being through the passage 30 and ports in the sleeve 15.

To maintain the pressure on the opposite pressure areas of the receiving piston 37 equalized under equilibrium conditions, the pressure supply passage 30 communicates through a needle valve 42 with a passage 43 leading to the chamber 40 through a groove 44 around the sleeve 15 and ports in the latter. The stem of the needle valve threads into the casing 6 and is adjustable to vary the rate of leakage through the valve.

To obtain the droop producing force from the motion of the servo 1, the servo rod 7 carries a second piston 44 slidable in a stationary cylinder 45 one end portion of which is connected to the sump through a port 46ª and a passage 46ᵇ and the other end is connected through a port 47 to a separate branch passage 48 leading to the passage 43. In response to movement of the servo piston 3 in the speed-increasing direction to the right, the volume of the cylinder 45 is increased and the pressure in the chamber 40 correspondingly decreased. Since the pressure in the chamber 41 remains constant, the pressure differential due to the pressure drop in the chamber 40 results in the application of an upwardly directed force to the piston 37, this force being derived from the constant pressure source as permitted by the servo motion.

Conversely, application of an upwardly directed flyball or control force to the pilot valve and the consequent reverse movement of the servo piston in the speed-decreasing direction under the action of the spring 10 increases the fluid pressure in the chamber 40 above the constant pressure in the chamber 41. As a result of this pressure differential, a downwardly directed resultant force is to be applied to the receiving piston. In each instance, the modifying force applied to the piston 37 is in opposition to the control force which the flyballs apply to the pilot valve 26 as a result of a detected speed variation. The modifying force thus changes the effective speed setting of the governor in the direction of the speed change and therefore imparts a droop or proportioning characteristic.

To enable the modifying force to be built up proportionately with servo displacement and to avoid hydraulic locking of the valve stem against proper response to changes in the flyball force, it is necessary to provide a two-way yield somewhere in the restoring connection between the servo piston 3 and the valve land 28. Herein, the yield is located in the hydraulic part of the connection through the use of an accumulator 49 comprising a plunger 50 slidable in a cylinder 51 which is defined by a bushing 52 and communicates at opposite ends with the constant pressure supply passage 30 and the controlled pressure passage 48. Springs 53 and 54 act in compression between the plunger and the closed ends of the cylinder 51 so that the plunger assumes the neutral position shown when the pressures in the chambers 40 and 41 are equalized. The scale of the springs 53 and 54 is correlated with the areas of the transmitting and receiving pistons 44 and 37 so as to provide for building up of the modifying force at the desired rate. Herein, the effective areas of the pistons 37, 44 and the accumulator plunger 50 are 0.1, .329, and 0.15 of a square inch respectively and the scale of the springs is about 7.5 pounds per inch. The scale of the speeder spring 22 is 40 pounds per inch. For any given rate of leakage through the needle valve 42, it will be apparent that the rate at which the pilot valve land 28 is brought back to centered position under the force applied to the piston 37 following a speed change is determined by several factors including the accumulator characterisics, that is, the area and spring scale, the areas of the pistons 37 and 44, and the rate of movement of the servo piston 3.

The accumulator is operable in either of two directions and is selectively energized by the modifying force. It coacts with the needle valve 42 to effect slow dissipation of the modifying force and actuation of the pilot valve to restore the speed to the desired value. Thus, it will be observed that the displacement of fluid by the transmitting piston 44 causes the accumulator piston 50 to move in one direction or the other against the force of the springs 53 and 54. The energy thus stored makes up for leakage through the needle valve thereby continuing the application of the modifying force to the piston 37 while permitting gradual decrease and eventual dissipation of this force. The effect of the resulting readjustment of the pilot valve loading is to gradually and progressively dissipate the speed droop and bring the prime mover speed back to desired value predetermined by the speeder spring setting above. Such restoring takes place at a decreasing rate because the accumulator spring force decreases with the movement of the plunger 50.

The accumulator may be utilized conveniently as a by-pass valve for limiting the extent of compensating pressure build-up in either direction thereby limiting the amount of speed adjusting compensation. For this purpose, the bushing 52 is formed with a port 55 communicating with the constant pressure passage 30 through a channel 56 and with a port 57 connected to the controlled pressure passage 48 through a channel 58. The ports 55 and 57 are normally covered by the plunger 50 and are arranged in overlapping relation so that movement of the plunger to the left against the action of the springs 53 and 54 in response to a predetermined pressure increase in the chamber 40 will uncover the port 55 and by-pass fluid to the contant pressure passage 30, the other port 57 remaining covered. The magnitude of the compensating force that may build up during servo movement to correct for a speed increase is thus definitely limited. When the pressure in the chamber 40 decreases below a limit value predetermined by the combined scale of the springs 53 and 54 and the location of the port 57, the plunger 50 uncovers this port permitting fluid from the constant pressure passage to flow into the chamber 40 and thereby limit the pressure differential that may be developed in response to a large movement of the transmitting piston 44.

The operation of the compensating mechanism above described may be summarized as follows assuming that the controlled prime mover is operating at the speed for which the governor is set, the parts then being in the equilibrium positions shown in Figs. 1 and 2. If the load is increased and the speed thereby decreased, the flyballs will move in, allowing the speeder spring to apply a downwardly directed force that moves the valve control land 28 to uncover the port 27 and permit a flow of pressure fluid to the servo cylinder 4 forcing the piston 3 to the right against the action of the spring 10. The prime mover regulator is thus moved to correct for the speed decrease and at the same time, the motion of the piston 44 causes a decrease in the pressure in the chamber 40. Since the pressure in the chamber 41 remains substantially constant, the pressure differential thus created results in the application to the piston 37 of an upwardly directed force which decreases the effective speed setting of the governor, thereby permitting the valve 26 to close at a speed below that of the original adjustment. Thus, a drooping characteristic is introduced which prevents hunting during correction for the speed change. This droop starts to dissipate immediately under the action of the accumulator spring and leakage through the needle valve, normal speed adjustment being fully restored when the pressures on opposite sides of the piston 37 again become fully equalized.

Now, if the load decreases resulting in a speed increase, the valve land 28 is raised by the flyballs and the energization of the servo is reduced by the flow of fluid from the cylinder 4 to the sump. The resulting motion of the regulator rod in the speed decreasing direction to the left under the action of the spring 10 forces fluid out of the cylinder 45 thereby charging the accumulator correspondingly and causing the pressure in the chamber 40 to be increased proportionately up to a limit determined by the by-pass port 55. The piston 37 and valve stem are forced downwardly under the pressure differential thus created thereby recentering the land 28 and producing the stabilizing droop. As before, this droop is dissipated by the needle valve thereby causing restoration of the prime mover speed to the desired value.

The compensating mechanism above described possesses numerous structural and functional advantages. By maintaining a super-atmospheric pressure on one side of the receiving piston 37 and raising or lowering the pressure on the other side to create the modifying force in the proper direction, the operation of the compensating mechanism is unaffected by external pressure changes. Moreover, no limitations are placed on the magnitude of the compensating force which may be developed.

The valve and receiving piston structure also lends itself to use with a differential type fluid servo. Such an arrangement is shown in Fig. 3 wherein the rod end of the servo cylinder 4 is connected through a passage 60 with the supply pressure line 30. Thus, a constant force is applied to the servo piston in opposition to the regulating pressure applied to the head end of the cylinder 4 and the compensating force applied to the piston 44. The pistons 3 and 44 are sized so that the effective area of the rod end of the piston 3 less the effective area of the piston 44 is approximately one-half the area of the head end of the piston 3. As a result, the regulating pressure in the cylinder 4, when equilibrium is established, will be approximately one-half of the constant pump supply pressure and equal forces will be available for moving the servo piston in opposite directions with corresponding speed changes. Except for this change in the mode of operation of the servo, the apparatus shown in Fig. 3 operates in the same manner as that shown in Figs. 1 and 2, the compensating mechanisms being identical both in construction and mode of operation.

Fig. 4 illustrates an adaptation of the present invention to a regulator in which the control or flyball force and the modifying or compensating force are exerted on different elements of the control device or valve, the parts in common with the form shown in Fig. 1 bearing the same reference numerals. In this modification the ports 27 of the pilot valve 26 are in a bushing 61 which is slidable axially in the rotating sleeve 15 driven from its lower end and carrying one of the pump gears 29ª. The compensating receiving piston 37 is rigid with the lower end of the valve bushing 61 and its cylinder 38 is defined by an enlarged bore in the ported sleeve 15. The spaces 40 and 41 on opposite sides of the piston communicate with the constant pressure passage 30 and the passage 43 which leads to the lower end of the cylinder 45 in which the transmitting piston 44 is disposed. The latter piston, which is carried by the servo piston rod 2, is also exposed on its upper side to fluid supplied from the constant pressure passage 30 which, as before, communicates with the passage 43 through the needle valve 42.

The space 40 is closed by a flange 62 on a bushing 63 fitting within the sleeve 15 and housing a single spring 64 compressed between collars 65 and 66 which are slidable on a stem 67 that projects downwardly from the piston 37. The collars are adapted to abut against the flange 62 and a shoulder 68 and also are adapted for abutting engagement with shoulders 69 and 70 on the stem 67. The ports 31 and 40a are elongated as indicated at 71 and 72 to provide for by-passing of fluid between the passage 30 and 43 so as to limit the compensating movement that may be developed.

In operation, a decrease in the prime mover speed results in lowering the pilot valve land 28 to admit pressure fluid to the servo thereby raising the regulating rod 2. This lowers the pressure in the space 40 and the resulting pressure differential causes downward movement of the piston 37 and the valve bushing 61 in a direction to center the valve. The rate of this movement which introduces speed droop is controlled mainly by the relative areas of pistons 44 and 37 and to a lesser degree by the recentering spring 64 and needle valve 42. By the combined action of the spring 64 and the needle valve 42, the droop is dissipated gradually, equilibrium conditions being reestablished upon full restoration of the control point of the governor. Similar action takes place in response to a speed increase in which case the pressure in the compensating space 40 is raised above the constant pressure to cause the bushing 61 to follow the upward movement of the valve land 28, the spring 64 being, in this case, compressed from its lower end.

I claim as my invention:

1. Regulating apparatus having, in combination, a pressure actuated servo having a movable member, two cylinders arranged end to end, a stem in said cylinders slidable axially, means for applying a control force to said stem, a land on said stem cooperating with ports in one of said cylinders to form a valve which is opened and closed to regulate the flow of fluid to and from said servo, a piston on said stem spaced from said land and having effective pressure areas on both sides thereof, means supplying fluid at a constant super-atmospheric pressure to the space between said lands and said piston, the remote end of the piston cylinder defining a fluid filled chamber, means providing a restriction continuously connecting said chamber and said space and permitting the slow leakage of fluid therebetween, and means responsive to the motion of said servo member following a change in said control force to raise or lower the pressure in said chamber correspondingly and thereby produce a pressure differential urging said valve land toward valve closed position.

2. Regulating apparatus having, in combination, two cylinders of different diameters arranged end to end and communicating with each other, a stem in said cylinders slidable axially in response to changes in a control force, a land on said stem cooperating with ports in one of said cylinders to form a valve, a piston intermediate the ends of said stem and spaced from said land, said piston having effective pressure areas on both sides thereof, means supplying fluid at a constant super-atmospheric pressure to the space within said cylinders and between said piston and the land, the other end of said cylinder defining a fluid filled chamber, means providing a restriction continuously connecting said chamber and said space and permitting the slow leakage of fluid therebetween, and means responsive to a change in said control force to raise or lower the pressure in said chamber correspondingly and thereby produce a pressure differential exerted on said piston in opposition to the change in said control force.

3. A regulating system having, in combination, a control device having a movable part, means for detecting deviations of a condition to be controlled from a predetermined value and correspondingly moving said part, means providing oppositely facing piston areas on said movable part, means coacting with the respective areas to define closed fluid filled chambers, means for maintaining the fluid in one of said chambers at a substantially constant super-atmospheric pressure, means operable automatically following movement of said control part in response to a condition change to vary the pressure in the second chamber correspondingly and thereby create a pressure differential to restore said part to its former position, means establishing continuous restricted communication between said chambers, a cylinder communicating at opposite ends with the respective chambers, a piston within said cylinder, and spring means yieldably resisting movement of said piston in opposite directions away from a normal position.

4. A regulating system having, in combination, a servomotor having a movable member, a control device governing the operation of said servomotor to position said member and having a part movable in opposite directions from a neutral position in response to opposite changes in a control force, a piston positively connected to said movable part for movement therewith at all times and having effective pressure areas facing in opposite directions, means defining fluid filled chambers on opposite sides of said piston, means for maintaining the fluid in one of said chambers continuously at a constant super-atmospheric pressure, means providing a restriction permitting the slow leakage of fluid therethrough to normally equalize the pressures therein, means providing a fluid filled passage between said servo member and the second one of said chambers and actuated by movement of the servo member to increase or decrease the pressure in said second chamber and thereby produce a temporary pressure differential acting on said piston in a direction to return said control part to said neutral position, and resilient means included in the restoring connection between said servo member and said movable control part to establish the value of the differential pressure through yielding of the connection whereby to effect control of said differential pressure and gradual dissipation of the differential by leakage through said restriction.

5. Regulating apparatus having, in combination, a control device having parts relatively movable in opposite directions away from a normal neutral position in response to opposite deviations of a control force from a predetermined value, means connected to one part of said control device for movement therewith and providing opposite effective pressure areas of equal size, means coacting with the respective pressure areas to define fluid filled chambers, means for maintaining the fluid in one of said chambers under a super-atmospheric pressure of constant value, a continuous fluid connection between said chambers including a restriction permitting slow leakage of fluid therebetween and normal equalization of the pressures in said chambers, and means operable automatically following movement of said control parts out of said neutral position to correspondingly vary the pressure in the other of said chambers and create a pressure differential in a direction to restore said control parts to said neutral position, said means including energy storing means coacting with said connection to maintain said slow leakage and thereby effect gradual dissipation of the pressure differential.

6. Regulating apparatus having, in combination, a power actuated servo having a movable member, a control device having a part movable in opposite directions in response to opposite changes in a control force, said device controlling the energization of said servo to variably position said member, a piston rigidly connected to said part, a first cylinder defining fluid filled chambers on opposite sides of said piston, means operative as an incident to the motion of said servo member following a change in said control force to increase or decrease the pressure in one of said chambers relative to a predetermined normal value and cause a corresponding modifying force to be exerted on said piston in a direction opposed to the change in the control force, means providing two spaces having a common movable wall and respectively communicating with said chambers, spring means acting on said wall and energized selectively by motion of the wall incident to motion of said servo member and establishing a pressure differential between said chambers, and means for effecting gradual dissipation of the energy stored in said spring means and the pressure differential between said chambers.

7. Regulating apparatus having, in combination, a control device having relatively movable parts, means for detecting deviations of a condition to be controlled from a predetermined value and mechanically applying a control force to one of said parts to move the latter correspondingly, a power actuator having a movable member and controlled by said device to variably position the member, a piston rigid with one part of said control device and having effective pressure areas of equal size on opposite sides thereof, a cylinder in which said piston slides defining fluid filled chambers on opposite sides of said piston, means for maintaining the fluid in one of said chambers under a super-atmospheric pressure of constant value, means establishing continuous restricted communication between said chambers to permit slow leakage of fluid therebetween and normal equalization of the pressures in the two chambers, a separate fluid system communicating with said second chamber, and means operable by movement of said actuated member resulting from a change in said control force to increase or decrease the pressure in the second chamber relative to said constant pressure and thereby create a pressure differential in a direction to oppose the change in said control force, and means yieldably controlling the building up of said pressure differential in either direction.

8. A regulating system having, in combination, a servo motor having a regulating member movable varying distances in opposite directions, a control device responsive to changes in a control force and governing the operation of said servo motor, said control device including a piston movable in opposite directions to modify the controlling action of said device, means defining chambers on opposite sides of said piston, a fluid filled space continuously communicating with one of said chambers and expandable and contractible with the opposite movements of said regulating member, means providing a source of fluid under constant super-atmospheric pressure continuously communicating with said other chamber, a fluid connection between said chambers having a restriction therein permitting slow leakage of fluid therebetween, two fluid filled spaces having a common movable wall and connected at opposite ends to the respective chambers, and springs acting on said wall in opposition to each other to normally locate the wall in a position of balance of the springs.

9. Regulating apparatus having, in combination, a control device having parts relatively movable in opposite directions away from a normal neutral position in response to opposite deviations of a control force from a predetermined value, piston means movable with one part of said control device and having oppositely facing effective pressure areas, means coacting with the respective pressure areas to define closed fluid filled chambers, means for maintaining the fluid in one of said chambers under a super-atmospheric pressure of constant value whereby to urge said wall continuously in one direction, means operable automatically following movement of said control parts out of said neutral position to vary the pressure in the other of said chambers correspondingly and thereby create a pressure differential in a direction to restore said control parts to said neutral position, means yieldably controlling the building up of said differential in either direction, and means establishing continuous restricted communication between said chambers for effecting gradual dissipation of the pressure differential.

10. Regulating apparatus having, in combination, means providing fluid sources at relatively low and high pressures, a control device for controlling the flow of fluid from said high pressure source and having parts relatively movable in opposite directions away from a normal neutral position in response to opposite deviations of a control force from a predetermined value, a wall movable with one part of said control device and having oppositely facing effective pressure areas, means coacting with the respective pressure areas to define closed fluid filled chambers isolated from said low pressure fluid source, means establishing continuous connection between one of said chambers and said high pressure source whereby to cause said wall to be urged in one direction continuously, means operable automatically following movement of said control parts out of said neutral position to increase or decrease the pressure in said other chamber above or below that in the first chamber and thereby create a difference in pressure between the chambers acting in a direction to restore said control parts to said neutral position, means yieldably controlling the building up of said differential in either direction, and means establishing continuous restricted communication between said chambers for effecting gradual dissipation of the pressure differential.

11. Regulating apparatus having, in combination, a servo motor having a movable actuated member, means providing relatively low and high pressure sources of fluid, a control device governing the flow of fluid to said servo from said high pressure source and from the servo to said low pressure fluid source, said device having parts relatively movable in opposite directions away from a normal neutral position in response to opposite deviations of a control force from a predetermined value, a wall movable with one part of said control device and having oppositely facing effective pressure areas, means coacting with the rsepective pressure areas to define closed fluid filled chambers isolated from said low pressure source, means normally maintaining the fluid in both of said chambers at superatmospheric pressures higher than said low pressure source and operable as an incident to a change in the position of said servo member to correspondingly vary the pressures in said chambers and produce a resultant pressure differential acting on said wall to urge said control parts toward said neutral position, and means providing a continuous fluid connection between said chambers including a restriction permitting gradual dissipation of said differential and normal equalization of the superatmospheric pressures in the chambers.

12. Regulating apparatus having, in combination, means providing fluid sources at relatively low and high pressures, a control device for controlling the flow of fluid from said high pressure source and having parts relatively movable in opposite directions away from a normal neutral position in response to opposite deviations of a control force from a predetermined value, a wall movable with one part of said control device and having oppositely facing effective pressure areas of equal size, means coacting with the respective pressure areas to define closed fluid filled chambers isolated from said low pressure fluid source, means deriving fluid from said high pressure source and operable to continuously maintain the fluid in both of said chambers at superatmospheric pressures higher than said low pressure source and to vary the pressure in at least one of the chambers according to the direction of displacement of said movable control parts out of said neutral position whereby to produce a resultant pressure differential acting on said wall to urge said parts toward the neutral position, and means providing a continuous fluid connection between said chambers including a restriction permitting slow leakage of fluid therebetween and normal equalization of the superatmospheric pressures in the chambers.

13. Regulating apparatus having, in combination, a control device having parts relatively movable in opposite directions away from a normal neutral position in response to opposite deviations of a control force from a predetermined value, means providing two fluid filled isolated chambers separated by a wall movable with one part of said control device and having oppositely facing effective pressure areas of equal size, means providing a continuous fluid connection between said chambers including a restriction permitting slow leakage of fluid therebetween and normal equalization of the pressures in the chambers, and means operating continuously to maintain the fluids in both of said chambers under superatmospheric pressures and to vary the pressure in at least one of the chambers according to the direction of displacement of the movable control parts out of said neutral position whereby to produce a pressure differential and a resultant force acting on said pressure areas urging said wall and said parts toward said neutral position until the pressures in said chambers have again been equalized by leakage through said restriction.

14. Regulating apparatus having, in combination, a control device having parts relatively movable in opposite directions away from a normal neutral position in response to opposite deviations of a control force from a predetermined value, a member movable with one part of said control device and having oppositely facing pressure areas of equal size, means coacting with the respective pressure areas to define fluid filled chambers, means for delivering fluid under pressure to one of said chambers to maintain a substantially constant super-atmospheric pressure therein, means operable automatically in response to each change in said control force and the resulting movement of said control parts out of said neutral position to vary the pressure in the other of said chambers correspondingly and thereby create a pressure differential acting on said member in a direction to restore said control parts to said neutral position, means yieldably resisting the building up of said differential in either direction, and means establishing continuous restricted communication between said chambers for effecting gradual dissipation of said pressure differential and normal equalization of the pressures in said chambers.

GEORGE FORREST DRAKE.

REFERENCES CITED

The following references are of record in the file of this patent:

UNITED STATES PATENTS

| Number | Name | Date |
|---|---|---|
| 2,364,817 | Reggio | Dec. 12, 1944 |